US009896146B2

(12) United States Patent
Lu

(10) Patent No.: US 9,896,146 B2
(45) Date of Patent: Feb. 20, 2018

(54) TWO-AXLE VEHICLE BALANCE SCOOTER

(71) Applicant: USMMT LLC, New York, NY (US)

(72) Inventor: Nanfang Lu, Shenzhen (CN)

(73) Assignee: USMMT LLC, New York, NY (US)

( * ) Notice: Subject to any disclaimer, the term of this patent is extended or adjusted under 35 U.S.C. 154(b) by 111 days.

(21) Appl. No.: 15/135,782

(22) Filed: Apr. 22, 2016

(65) Prior Publication Data

US 2017/0166278 A1    Jun. 15, 2017

(30) Foreign Application Priority Data

Dec. 14, 2015  (CN) .......................... 2015 1 0918103

(51) Int. Cl.
*B62K 3/00* (2006.01)
*B60K 1/04* (2006.01)

(52) U.S. Cl.
CPC ................ *B62K 3/007* (2013.01); *B60K 1/04* (2013.01); *B60Y 2200/126* (2013.01); *B60Y 2200/81* (2013.01)

(58) Field of Classification Search
CPC combination set(s) only.
See application file for complete search history.

(56) References Cited

U.S. PATENT DOCUMENTS

| 7,481,291 | B2 * | 1/2009 | Nishikawa | B62K 17/00 180/181 |
| 8,225,891 | B2 * | 7/2012 | Takenaka | B62K 11/007 180/7.1 |
| 8,738,278 | B2 * | 5/2014 | Chen | B62K 3/007 180/218 |
| 8,925,657 | B2 * | 1/2015 | Kamen | B60G 17/019 180/21 |
| D737,723 | S  * | 9/2015 | Ying | D12/1 |
| D738,256 | S  * | 9/2015 | Ying | D12/1 |
| 9,376,155 | B2 * | 6/2016 | Ying | B62D 51/001 |
| D778,782 | S  * | 2/2017 | Chen | D12/1 |
| D780,626 | S  * | 3/2017 | Li | D12/1 |
| D783,751 | S  * | 4/2017 | Yao | D21/760 |
| D784,195 | S  * | 4/2017 | Ying | D12/1 |
| D784,196 | S  * | 4/2017 | Ying | D12/1 |
| D784,198 | S  * | 4/2017 | Zhu | D12/1 |
| D785,112 | S  * | 4/2017 | Ying | D21/760 |
| D785,113 | S  * | 4/2017 | Ying | D21/760 |

(Continued)

FOREIGN PATENT DOCUMENTS

CN          105416467 A       3/2016

*Primary Examiner* — Kevin Hurley
*Assistant Examiner* — Gabriela C Craciun
(74) *Attorney, Agent, or Firm* — Cowan, Liebowitz & Latman, P.C.; Mark Montague

(57) ABSTRACT

The two-axle vehicle balance scooter includes an upper shell, lower shell, pedal, pressure sensors, brackets, wheels, press block, shaft, chip, and battery pack. The brackets include a pedal bracket, hardware support, battery support and chip support. The press block includes a wheel pressure block and an axial compression block, from bottom to top on the housing gasket installed the pedal bracket and pedals. Both sides of the body are disposed around a middle section that is a battery holder below which a battery is installed. Accordingly, the scooter is symmetrical thus providing better stability, easier handling, easy installation and removal of a battery and other benefits.

8 Claims, 3 Drawing Sheets

(56) References Cited

U.S. PATENT DOCUMENTS

| | | | |
|---|---|---|---|
| D785,114 S * | 4/2017 | Ying | D21/760 |
| D785,115 S * | 4/2017 | Ying | D21/760 |
| D785,736 S * | 5/2017 | Ying | D21/760 |
| D786,130 S * | 5/2017 | Huang | D12/1 |
| D786,994 S * | 5/2017 | Chen | D21/760 |
| D786,995 S * | 5/2017 | Ying | D21/760 |
| 9,643,077 B2 * | 5/2017 | Bigler | A63C 17/08 |
| 2004/0005958 A1 * | 1/2004 | Kamen | A61G 5/04 482/51 |
| 2004/0063556 A1 * | 4/2004 | Wischusen | 482/148 |
| 2006/0202439 A1 * | 9/2006 | Kahlert | B62K 11/007 280/47.24 |
| 2012/0166048 A1 * | 6/2012 | Inoue | G05D 1/0061 701/49 |
| 2015/0096820 A1 * | 4/2015 | Strack | B62K 11/007 180/181 |
| 2016/0184690 A1 * | 6/2016 | Aders | A63C 17/004 180/20 |

* cited by examiner

TWO-AXLE VEHICLE BALANCE SCOOTER

REFERENCE TO RELATED APPLICATION

The present application claims priority to Chinese patent application no. 201510918103.0, filed Dec. 14, 2015, the disclosure of which is fully incorporated herein by reference.

FIELD OF THE INVENTION

The present invention relates generally to a self-balancing scooter, in particular a two-axis balance scooter.

BACKGROUND

A self-balancing scooter is also known as a children exercise bicycle or a swing car. The main body of the self-balancing scooter is made by injection molding of polypropylene.

The self-balancing scooter structure is stable, is simply operated, is without a storage battery and transmission, and as long as one turns left and right using the steering wheel, you can drive one back and forth freely. It is an environmentally friendly green-toy. A self-balancing scooter price is reasonable, which applies to children's programs. It can be used for both single-player and multiplayer, which is good for children in order to develop study and teamwork ability. Since the balancing scooter is low to the ground, it is relatively safe. But now scooter is available in the market left and right. The intermediate shaft is connected together. This structure exists in the course of the rotation is not flexible, and when vehicle speed is too fast, it is difficult or not possible to control turning. A self-balancing scooter battery is installed on one side of the device, about the proportion of asymmetry, providing instability. The battery pack is installed in a sealed state, without ventilation, and cannot be demolished, and thus there is a safety risk.

OBJECT AND SUMMARY OF THE INVENTION

Accordingly, the invention described herein seeks to provide a two-axle vehicle balance scooter that addresses the problems in the background art mentioned above.

To achieve the above object, the two-axle vehicle balance scooter of the present invention is summarized/described as follows. The scooter includes an upper shell, a lower shell, a pedal, a pressure sensor, a frame, wheels, clamps, a shaft, a chip and a battery pack. A bracket includes a pedal bracket, hardware support, a battery support and a chip support. A pressure block includes a wheel pressure block and an axial compression block, and an indicator is installed on the upper shell, the upper shell from bottom to top installing gasket, the pedal bracket and the pedal pressure sensor mounting hole in the panel hardware support. A metal bracket is connected with the upper housing and the lower end of the hardware support with a spring, a wheel pressure block mounted on wheels, with the wheels mounted on the outside of the hardware support. The number of bearings is two bearings mounted on the shaft through both ends of the battery support. The other end of the shaft is through the axial compression block and hardware support connected to the battery pack installed in the bottom of the battery support. The other end of the shaft through the axial compression block and hardware support connected to the battery pack installed in the bottom of the battery support. The chip is fixed to the bracket inside the chip support. The chip support is mounted on the lower end of the hardware support. The lower end of the chip support is attached to the lower shell.

As a further aspect of the invention, the pedal is made of silica gel material.

As a further aspect, between the hardware bracket and the upper shell and between the upper shell and chip support, both are connected via bolts.

As yet a further aspect, the battery pack is installed at the bottom of the battery holder via a buckle.

As still yet a further aspect, the number is two pieces for the upper shell, lower shell, pedal, metal bracket and the rotating shaft. The number of springs, the pressure sensor and the gasket is four pieces.

In accordance with the invention, a two-axle vehicle balance scooter, comprises a first housing including first upper and lower shells, a first pedal disposed between the first upper and lower shells structured to be moved by a first foot of an operator, a first pressure sensor sensing a pressure of the first foot on the first pedal; a second housing including second upper and lower shells, a second pedal disposed between the second upper and lower shells structured to be moved by a second foot of the operator, a second pressure sensor sensing a pressure of the second foot on the second pedal; a battery support disposed between the first and second housings; a battery installed within a lower end of the battery support; a first wheel extending from a first shaft and controlled via movement of the first foot of the operator on the first pedal; and a second wheel extending from a second shaft and controlled via movement of the second foot of the operator on the second pedal.

As a feature of the invention, the battery is removable from the battery support.

As another feature, the first and second housings are disposed on opposite sides of the battery support in a symmetrical arrangement.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

Figure 1:
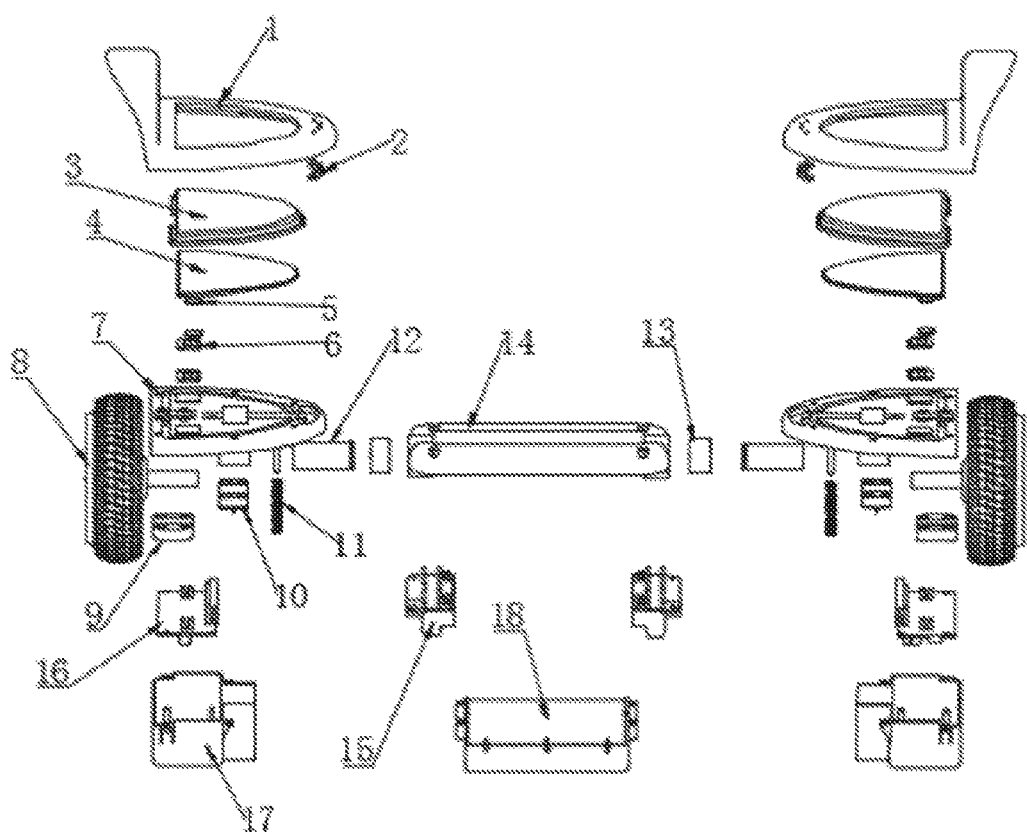
FIG. 1 is an exploded view of the two-axle vehicle balance scooter of the present invention.
Figure 2:
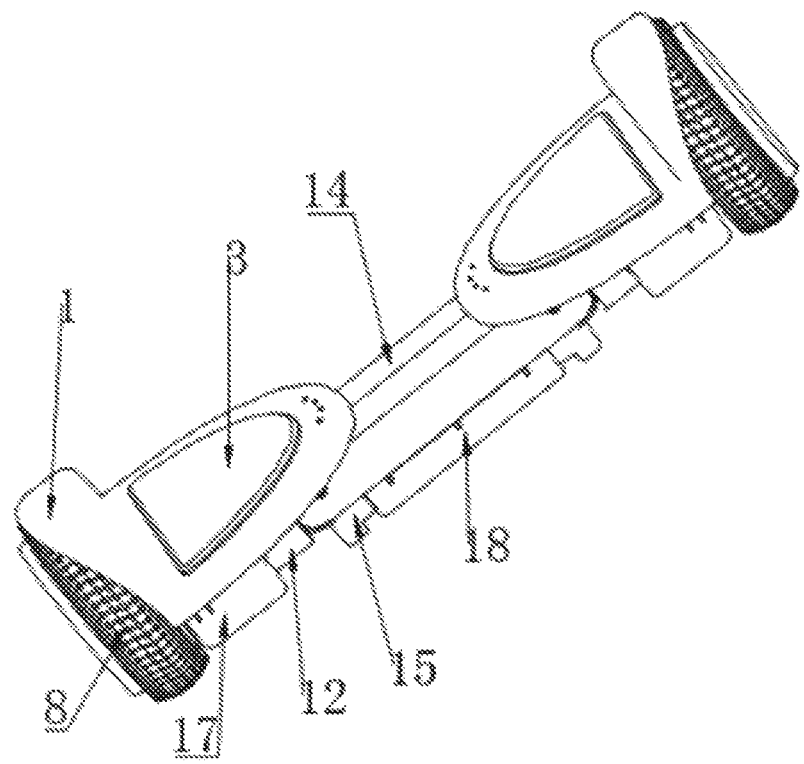
FIG. 2 is a perspective view of the two-axle vehicle balance scooter.
Figure 3:
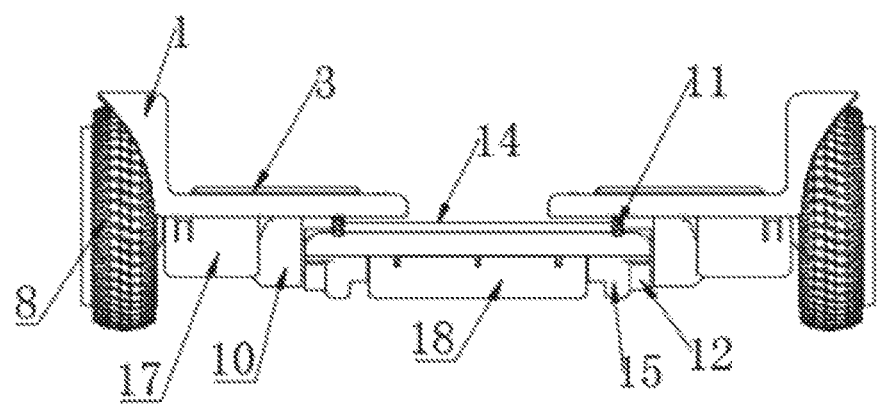
FIG. 3 is a front view of the two-axle vehicle balance scooter.
Figure 4:
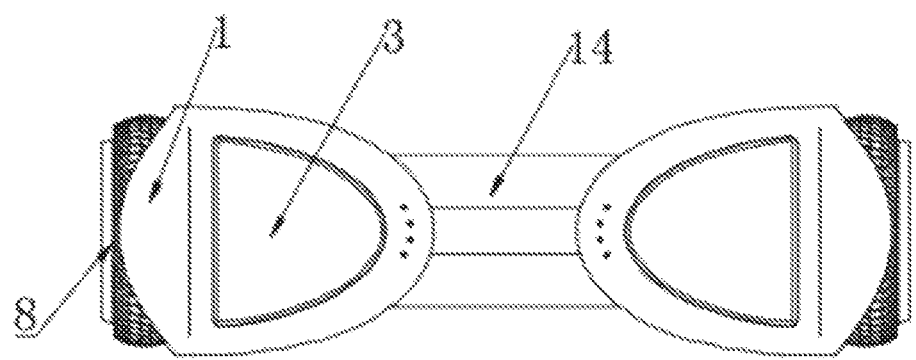
FIG. 4 is a top view of the two-axle vehicle balance scooter.

Referring now to the accompanying drawings, FIGS. 1-4 thereof schematically illustrate the two-axle vehicle balance scooter of the present invention. The two-axle vehicle balance scooter also is referred to herein as a two-axis balancing twist car and, for convenience, sometimes is referred to simply as a car.

The following components are shown in the figures: 1—upper shell, 2—indicator, 3—pedal, 4—pedal bracket, 5—gasket, 6—pressure sensor, 7—hardware support, 8—wheels, 9—wheel pressure block, 10—axial compression block, 11—spring, 12—shaft, 13—bearing, 14—battery support, 15—lower shell, 16—chip, 17—chip support, 18—battery pack. The left and right sides of the two-axle vehicle balance scooter are symmetrical and the components of the right side are not identified with reference numbers in FIG. 1 so as to not obscure the figure.

The figures show that each side (i.e., the left side and right side) of the two axis balancing twist car comprises, among other components, an upper shell 1, a lower shell 15, a pedal 3, and a pressure sensor 6. Pressure sensor 6 is specifically shown in FIG. 1.

The car includes a bracket and wheels 8, the pressing block and shaft 12, chip 16 and a battery pack 18. The bracket includes pedal bracket 4, hardware support 7-14, battery holder and chip support 17-9. The pressure block comprises a wheel pressure block and an axial pressing block 10. Indicating lamp 2 is installed in the shell 1.

Shell 1 from the first is orderly provided with a gasket 5, pedal bracket 4 and 3, pressure sensor installed in the metal stent 7 panel hole, metal stent 7 and shell 1 connection and hardware support is sheathed on the lower end of a spring 11. Wheel pressure block 9 is mounted on wheels 8, wheels 8 mounted hardware outer arm 7. There are two bearings 13 and the bearing 13 by two rotary shaft 12 is mounted at both ends of the battery support 14, the other end of the shaft 12 through the axial compression block 10 and the hardware support 7 is connected to the battery pack 18 is mounted in the battery support the lower end 14, the chip 16 in the chip support 17 is fixed inside the core.

Chip support 17 is mounted on the lower end of the hardware support 7. The lower end of the chip support 17 is attached to the lower shell 15. Pedal 3 using silica gel material. Between hardware support 7 and the upper shell 1, the chip support is bolted hardware support between 17 and 7. The battery pack 18 by snap-mounted on the lower end of the battery support 14. The number of the upper shell 1, lower shell 15, pedals 3, hardware support 7 and the shaft 12 are two. The number of springs 11, pressure sensors 6 and gasket 5 are four.

To operate the car, the user presses the switch button, places the foot on the pedal 3, and operates the apparatus. The battery support 14 is fixed to the two ends of the shaft 12, the shaft 12 is connected to the other end of the left and right sides of 7, respectively metal stents. Use the left and right sides of the control shaft 12, respectively, twisting left and right sides of the body portion, driving the process on both sides of the body movement alone, the situation will not interfere with each other.

The battery pack 18 is mounted in the battery support 14 below so that the center of gravity of the entire vehicle is low, thus increasing vehicle stability. The battery pack 18 is assembled to have a quick release buckle, thus the removal and installation is very fast, is conducive to ventilation, easy to replace, and the transport process can be separated from the battery pack 18 separate consignments, thereby greatly improve the safety and security of transport.

The device design is reasonable, both sides of the body around the middle section of the battery support 14, the battery pack 18 is installed below the battery support 14 so that the car can achieve the proportion of symmetrical, and thus has easier handling, better stability, and help protects the personal safety of the users. Battery pack 18 using quick release buckle mounting, installation convenient, you can increase productivity, better ventilation cooling effect, greatly improving the safety of products, during transport of the battery pack 18 and other components can separate consignments, improve transportation safety, thereby reducing transportation costs.

Compared with current technology, the invention has the following various advantages. The device has a reasonable design, in particular, the main parts are on the two ends together with the battery holder in the middle. The battery pack is installed in the bottom of the battery holder so that the whole car can realize the proportion of symmetry, and thus is easier to operate when running, has better stability, and is conducive to the protection of rider's personal safety. The battery installation is via buckles that allows for a quicker removal and has the advantages of convenient installation so that it improves production efficiency and provides a better ventilation effect, greatly improve the safety of products. Also during the transportation of the device, the battery packs and other components can be separated for shipping which improves the transport safety so transportation costs can be reduced.

Moreover, it is appreciated that the present invention as described herein is illustrated and described in a manner sufficient to understand the present invention. So as to not unnecessarily obscure the description herein, not every single characteristic of a self-balancing scooter has been described. As would be appreciated by those of ordinary skill in the art, various features of self-balancing scooters are well known. For instance, the particular manner of control and powering/movement of the wheels of self-balancing scooters are well known. For instance, U.S. Pat. No. 8,738,278 describes a certain type of self-balancing vehicle. As an example, this patent mentions that motorized hub assemblies are known in the art. U.S. Pat. No. 8,738,278 is incorporated herein by reference.

The present invention has been described in the context of a preferred embodiment. It is to be understood, however, that other expedients known to those skilled in the art or disclosed herein may be employed without departing from the spirit of the invention.

Therefore, it is intended that the appended claims be interpreted as including the embodiment described herein, alternatives mentioned above, and all equivalents thereto.

What is claimed is:

1. A two-axle vehicle balance scooter, comprising:
a housing including an upper shell and a lower shell, a pedal, a pressure sensor, hardware support, wheels, a pressure block, a shaft, a chip and a battery pack,
a bracket including pedals bracket, the hardware support, a battery support and a chip support,
the pressure block including a wheel pressure block and an axial compression block,
an indicator disposed on an inside of the upper shell, the shell from a bottom to a top includes an attached gasket, the pedal bracket and the pedals,
a pressure sensor mounting hole disposed in the hardware support,
the hardware support connected with the upper shell and the lower shell end of a metal sleeve with a spring bracket,
the wheel pressure block mounted on the wheels,
the wheels mounted on an outside of the hardware support,
two bearing by the shaft and the bearing mounted at both ends of the battery support, the other end connected to the shaft by a shaft clamp bracket with hardware,
batteries installed in the lower end of the battery support, the chip support fixed inside the chip, the chip in hardware support the lower end of the bracket, the lower end of the chip support attached to the lower shell.

2. The two-axle vehicle balance scooter according to claim 1, wherein the pedals are made of silicon.

3. The two-axle vehicle balance scooter according to claim 1, wherein, between the chip support and the hardware support the shell support are connected by a bolt.

4. The two-axle vehicle balance scooter according to claim 3, wherein the battery pack is installed in the end of the battery support by snap-fitted.

5. The two-axle vehicle balance scooter according to claim 4, wherein the scooter includes a double set of upper shells, lower shell, pedals, hardware support and shaft, and a quantity of springs, pressing blocks and gaskets is four.

6. A two-axle vehicle balance scooter, comprising:
   a first housing including first upper and lower shells, a first pedal disposed between the first upper and lower shells structured to be moved by a first foot of an operator, a first pressure sensor sensing a pressure of the first foot on the first pedal;
   a second housing including second upper and lower shells, a second pedal disposed between the second upper and lower shells structured to be moved by a second foot of the operator, a second pressure sensor sensing a pressure of the second foot on the second pedal;
   a battery support disposed between the first and second housings;
   a battery installed within a lower end of the battery support;
   a first wheel extending from a first shaft and controlled via movement of the first foot of the operator on the first pedal; and
   a second wheel extending from a second shaft and controlled via movement of the second foot of the operator on the second pedal.

7. The two-axle vehicle balance scooter according to claim 6, wherein the battery is removable from the battery support.

8. The two-axle vehicle balance scooter according to claim 6, wherein the first and second housings are disposed on opposite sides of the battery support in a symmetrical arrangement.

* * * * *